(No Model.) 2 Sheets—Sheet 2.

J. M. RAYMOND & L. E. LEMLEY.
ACETYLENE GAS GENERATOR.

No. 593,122. Patented Nov. 2, 1897.

Witnesses
D. H. Blakelock.
John C. Wilson.

Inventors:
John M. Raymond &
Louis E. Lemley
by Whitman & Wilkinson,
Attorneys.

UNITED STATES PATENT OFFICE.

JOHN MORTIMER RAYMOND AND LOUIS EDWARD LEMLEY, OF NEW ORLEANS, LOUISIANA, ASSIGNORS OF ONE-THIRD TO WILLIAM THOMAS COATS, OF SAME PLACE.

ACETYLENE-GAS GENERATOR.

SPECIFICATION forming part of Letters Patent No. 593,122, dated November 2, 1897.

Application filed May 6, 1897. Serial No. 635,414. (No model.)

*To all whom it may concern:*

Be it known that we, JOHN MORTIMER RAYMOND and LOUIS EDWARD LEMLEY, citizens of the United States, residing at New Orleans, in the parish of Orleans and State of Louisiana, have invented certain new and useful Improvements in Apparatus for Generating and Holding Acetylene Gas; and we do hereby declare the following to be a full, clear, and exact description of the invention, such as will enable others skilled in the art to which it appertains to make and use the same.

Our invention relates to improvements in apparatus for generating and storing gas by the chemical action of a liquid upon a solid material, such as water and calcium carbid, which produces acetylene gas.

Our invention has for its object to provide an improved generator of the gasometer variety, either portable or stationary; and it consists in the novel apparatus hereinafter described and claimed.

Reference is had to the accompanying drawings, wherein the same parts are indicated by the same letters throughout the several views.

Figure 1:
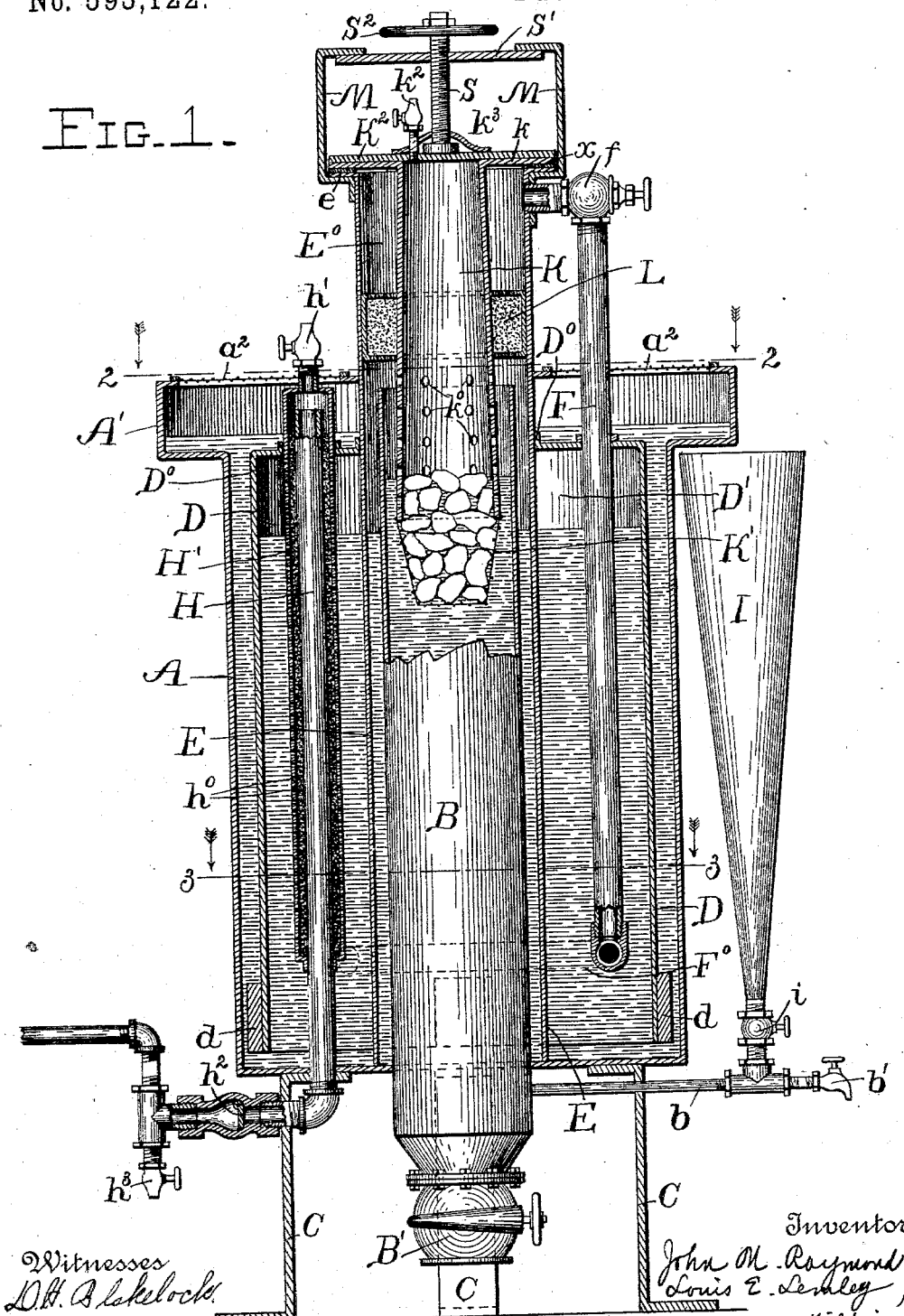
Figure 2:
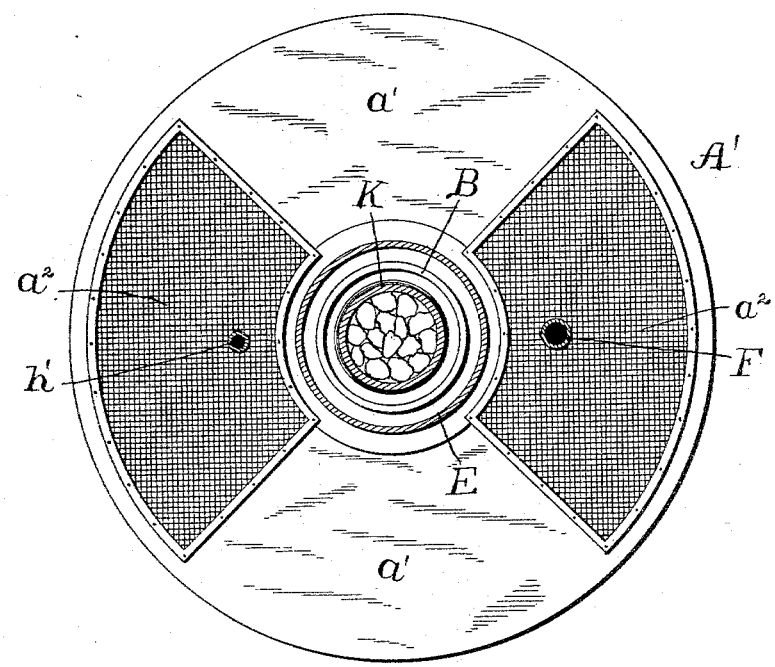
Figure 3:
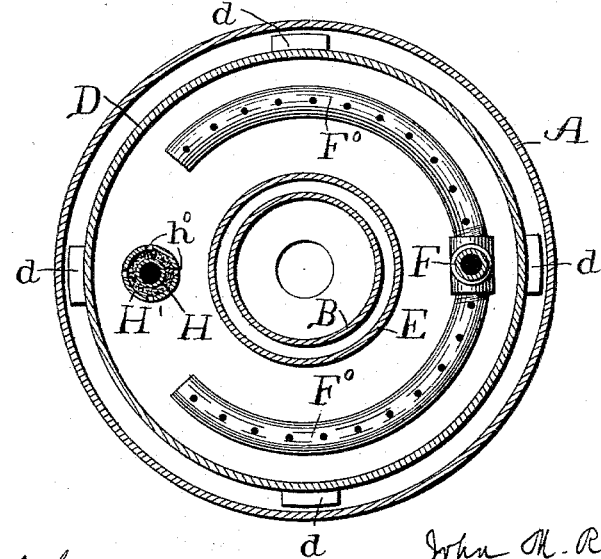

Figure 1 represents a central vertical section through our apparatus with some of the parts shown in elevation. Fig. 2 is a horizontal section through the apparatus, taken on the line 2 2 in Fig. 1 and looking in the direction of the arrows; and Fig. 3 is a horizontal section through the apparatus, taken on the line 3 3 in Fig. 1 and looking in the direction of the arrows.

A represents an outer tank provided with an enlarged top A'. The bottom of this outer tank A is provided with a central opening for the passage of the cylinder B, which fits closely in said opening. The enlarged upper end A' of the tank A is partially closed in, as shown at $a'$ $a'$ in Fig. 2, and partially fitted with wire-gauze, as shown at $a^2$ $a^2$ in the same figure. This enlarged upper portion of the tank forms an overflow-ring for the surplus water from the gasometer, as will be hereinafter more fully described.

The tank A is mounted upon any suitable supports, such as legs C. (Shown in Fig. 1.)

Within the tank A is mounted a larger cylinder D and a smaller concentric cylinder E. The former is open at its bottom and at its top closed and provided with openings therethrough for the passage of the said smaller cylinder E and the inlet and outlet pipes of the gasometer, F and H, respectively, as shown in Fig. 1. The smaller cylinder E is fixed in the head $D^0$ of the larger cylinder or gasometer D and at its lower end extends a short distance below the lower end of the said cylinder or gasometer D and rests upon the bottom of the outer tank A. In this way a space will be always left between the lower edge of the gasometer-cylinder D and the bottom of the outer tank A, through which space the water may pass freely from the said outer tank to the gasometer and back again, as will be obvious.

The pipe F, supplying the gas from the generator-cylinder E to the gasometer, is also fitted closely or fixed in the opening therefor through the head $D^0$ of the gasometer, but the outer surrounding casing H' of the outlet or supply pipe from the gasometer is so fitted in the head of the gasometer that the latter may slide vertically thereon.

The gasometer-cylinder D is fitted with guide-blocks $d$ thereon near or at its lower end to prevent displacement, as seen in Figs. 1 and 3.

The pipe F, leading from the generator-cylinder E to the gasometer, is provided with a valve $f$, by means of which the said pipe may be closed when desired, as when filling the generator with carbid. The lower end of this inlet-pipe F within the gasometer is connected to a perforated hollow ring or tube $F^0$, from which the gas escapes into the water within the gasometer and rises to the space D' in the upper portion thereof, from whence it escapes through the supply-pipe, as hereinafter described.

The outlet or supply pipe H is fitted with a concentric cylindrical perforated casing H', which is rigidly held in the head of the outer tank, but which passes closely though movably through the head of the gasometer, as above described. The upper end of the pipe H does not extend quite to the upper end of this casing H', and the said casing is provided with perforations $h^0$. A space is left between the said pipe and its surrounding casing for the reception of a suitable filtering material, such as sponge, which will act as a strainer for the gas as it escapes.

The upper end of the casing H' is provided with a petcock $h'$ to allow the air to escape from the gasometer when water is admitted thereto. The lower end of the supply-pipe H is provided outside of the tank with a flap-valve $h^2$ to prevent back pressure of the gas, and is also provided with a petcock $h^3$ for draining the said pipe.

As hereinbefore described, a cylinder B is fitted closely within a central opening in the outer tank A. This cylinder is open at the top and is provided at its bottom with a valve B' for cleaning the sediment from said cylinder. The generator-cylinder E fits over this cylinder B, and a space is left between the two cylinders, as shown.

Water is supplied to the cylinder B through a leading-in pipe $b$ by means of a funnel or reservoir I, or under pressure in any other suitable manner. A valve $i$ is provided in the lower end of this reservoir I to cut off the flow of water to the cylinder B, and a petcock $b'$ is provided on the pipe $b$ for draining the latter.

K represents the cylinder for the reception of the calcium carbid, which is fitted at its lower end with a metallic basket K'. This cylinder K is provided with a number of perforations $k^0$ for the escape of the gas therefrom and is made of a somewhat larger diameter at its lower end than at its upper end, so that the material from which the gas is to be generated may fall more readily into the basket K' therefor.

A filtering-basket L, provided with perforated heads, is fitted around the cylinder K and filled with a suitable filtering material through which the gas passes to the supply-space $E^0$ in the upper part of the generator-cylinder E.

The upper end of the cylinder K is provided with a wide flange $k$, which extends outwardly above the upper end of the generator-cylinder E, which is also provided with a flange $e$. A gasket $x$, of some suitable compressible material, is fitted between the flanges $k$ and $e$ on the cylinders K and E, respectively, to make a tight joint in the upper part of the chamber $E^0$.

A lid or cover $K^2$ is fitted over the upper end of the cylinders E and K and is held securely in place by means of a screw S, which passes through a plate S', held by clamps M, secured to the cylinder E. This screw S is provided with a hand-wheel $S^2$, by means of which the said screw may be turned to tighten or release the same in applying or removing the cover $K^2$, as the case may be.

A petcock $k^2$ is fitted in this cover for the purpose of exhausting the air from the chamber $E^0$ when water is admitted to the cylinder B, and a handle $k^3$ should also be provided for grasping the said cover.

The operation of the apparatus is as follows: The calcium carbid or other material from which the gas is to be generated is placed in the basket K' of the cylinder K in the desired quantity, and the said cylinder and basket are then put into place, as shown in Fig. 1, or the said material may be placed in the cylinder K without removing the latter, but by simply removing the cover $K^2$. The cover $K^2$ is then put in place and the screw tightened sufficiently to clamp the former in place. The petcocks $h^3$ and $b'$ should be closed and the petcocks $h'$ and $k^2$ should be opened. Water has previously been supplied to the tank A and gasometer either by pouring through the wire-gauze in the top of the former or in any other convenient way. The lower end of the cylinder E normally rests upon the bottom of the outer tank A and incloses the inner cylinder or water-tank B. Water is then admitted to the tank B through the funnel I and inlet-pipe $b$ and rises in the said tank until it comes into contact with the material in the basket K', when the gas will begin to escape therefrom. When the air has been exhausted from the generator through the petcock $k^2$ and from the gasometer through the petcock $h'$, these petcocks should be closed, and the gas, continuing to be given off from the material in the basket K', will escape through the perforations $k^0$ in the cylinder K and will pass upward through the filtering-basket L into the chamber $E^0$. From thence the gas will pass through the pipe F downward into the gasometer D and will escape into the water therein through the perforated pipe $F^0$ and rise to the space D' in the upper portion of the gasometer D, whence it passes through the perforations in the casing H' and the filtering material therein to the supply-pipe H to the point of consumption.

When the pressure within the gasometer reaches a sufficient point, the cylinder D and the cylinder E will be lifted somewhat and the basket K', containing the gas-producing material, will be lifted from the water in the tank B correspondingly, so that less gas will be generated until the pressure within the gasometer has become reduced somewhat, when the various parts will fall again, and a correspondingly larger amount of gas will be generated. The operation of the apparatus is therefore automatic, inasmuch as the supply in the gasometer will regulate the output from the generator, or, in other words, the greater the supply in the gasometer the less will be the amount of gas generated and the less the supply in the gasometer the greater will be the amount generated, the gas-producing material rising or falling in the water-tank B in proportion as the supply of gas in the gasometer increases or decreases, as will be obvious. The amount of gas generated is thus kept practically uniform if the discharge from the gasometer remains uniform, and no more gas will be generated than will be required.

When it is desired to stop the production entirely, the perforated cylinder K and the basket K′, containing the gas-producing material, may be removed, or the water may be drained from the tank B through the cock b′, and the gas will cease to be generated.

Should any leak occur into the enlarged chamber at the top of the tank A, the gas will escape through the wire-gauze in the head thereof, and this wire-gauze will prevent the accidental firing of the gas within the supply-chamber or gasometer.

Having thus described our invention, what we claim, and desire to secure by Letters Patent of the United States, is—

1. In an apparatus for the generation of gas by contact of a liquid with a solid material, the combination with an outer tank; a gas-holder within said outer tank; a liquid-reservoir in the center of said outer tank, and a leading-in pipe for supplying liquid to said reservoir; a cylinder entering the top of said outer tank concentric with said reservoir, and inclosing the latter; a perforated receptacle for the gas-generating material mounted in said cylinder and extending downward into said reservoir; a pipe leading from the upper portion of said cylinder into the lower portion of the gas-holder; a supply-pipe leading from said gas-holder; and a removable cover for said cylinder and receptacle, substantially as described.

2. In an apparatus for generating gas by contact of a liquid with a solid material, the combination with an outer tank; a gas-holder within said outer tank; a liquid-reservoir entering the bottom of said tank, and provided with a pipe leading thereto; a generator-cylinder entering the top of said tank concentric with said reservoir, and inclosing the latter; a perforated receptacle for the gas-producing material mounted in said generator-cylinder and extending into said reservoir; a filter-basket surrounding said receptacle above its perforations, and closing the space between said receptacle and said generator-cylinder, with a chamber above said filter; a removable cover for said receptacle and said generator-cylinder; a pipe leading from said chamber to the gas-holder; and a supply-pipe leading from said gas-holder, substantially as described.

3. In an apparatus for generating gas by contact of a liquid with a solid material, the combination with an outer tank; a gas-holder within said outer tank; a liquid-reservoir entering the bottom of said tank, and provided with a supply-pipe for liquid; a generator-cylinder entering the top of said tank concentric with said reservoir and inclosing the latter; a perforated receptacle for the gas-producing material mounted in said generator-cylinder and extending into said reservoir; a gas-chamber in the upper portion of said generator-cylinder; a removable cover therefor; a pipe leading from said gas-chamber to the gas-holder; a supply-pipe leading from said gas-holder; and a perforated casing inclosing the end of said supply-pipe and packed with filter material around said pipe, substantially as described.

4. In an apparatus for the generation of gas by contact of a liquid with a solid material, the combination with an outer water-tight tank having an enlarged upper portion forming an overflow-ring for the water from the gas-holder; a cover for said tank partially fitted with wire-gauze; a liquid-reservoir entering the bottom of said tank, and provided with a pipe leading thereto; a generator-cylinder entering the top of said tank and inclosing said reservoir; a receptacle for the gas-producing material mounted in said generator-cylinder and extending into said reservoir; a filter in said generator-cylinder; a gas-chamber above said filter; a removable cover for said generator-cylinder; a pipe leading from said gas-chamber therein to the bottom of the gas-holder; a supply-pipe leading from said gas-holder; and a perforated casing inclosing the end of said supply-pipe and packed with filter material around said pipe, substantially as described.

5. In an apparatus for generating gas by contact of a liquid with a solid material, the combination with an outer tank; a gas-holder within said outer tank; a liquid-reservoir entering the bottom of said tank, and provided with a valve for discharging sediment therefrom; a liquid-pipe entering said reservoir; a generator-cylinder entering the top of said tank and inclosing said reservoir; a receptacle for the gas-producing material mounted in said generator-cylinder and extending into said reservoir; a gas-chamber in the upper portion of said generator-cylinder; a removable cover therefor; an exhaust-cock in said cover; a pipe leading from said gas-chamber to the gas-holder; a supply-pipe leading from said gas-holder; a perforated casing inclosing the end of said supply-pipe and extending through the top of said tank; filter material interposed between said supply-pipe and said perforated casing; and an exhaust-cock at the top of said perforated casing, substantially as described.

6. In an apparatus for generating gas by contact of a liquid with a solid material, the combination with an outer water-tight tank; a gas-holder within said outer tank; a liquid-reservoir entering the bottom of said outer tank; a valve for discharging sediment therefrom; a generator inclosing the upper end of said reservoir; a receptacle for the gas-producing material mounted in said generator-cylinder and projecting into said reservoir; a gas-chamber in the upper portion of said generator-cylinder; a pipe leading from said chamber into the lower portion of the gas-holder; a hollow perforated ring connected to said pipe; a supply-pipe leading from the upper portion of said gas-holder; and a filter surrounding the inner end of said supply-pipe, substantially as described.

7. In an apparatus for generating gas by contact of a liquid with a solid material, the combination with an outer tank; a gas-holder within said outer tank; a liquid-reservoir in said outer tank; a draining-valve therein; an exterior liquid-reservoir; a pipe connecting the two said reservoirs; a valve in said pipe; a generator-cylinder entering the top of said tank and inclosing said liquid-reservoir therein; a receptacle for the gas-producing material mounted in said generator-cylinder and extending into said liquid-reservoir; a filter in said generator-cylinder, and a gas-chamber above said filter; a pipe leading from said gas-chamber to the lower portion of the gas-holder; and a supply-pipe leading from the upper portion of said gas-holder, and having a flap-valve therein, substantially as described.

In testimony whereof we affix our signatures in presence of two witnesses.

JOHN MORTIMER RAYMOND.
LOUIS EDWARD LEMLEY.

Witnesses:
JOHN J. SAUCIER,
F. E. SPRAGUE.